United States Patent
Wilke et al.

(10) Patent No.: US 11,226,351 B2
(45) Date of Patent: Jan. 18, 2022

(54) FLOW-THROUGH PIPE ADAPTER FOR OPTICAL FLOW MEASUREMENT

(71) Applicant: SIKA Dr. Siebert & Kühn GmbH & Co. KG, Kaufungen (DE)

(72) Inventors: Bastian Wilke, Kassel (DE); Andre Kleinwächter, Stäbelow (DE); Martin Schäper, Rostock (DE); Nils Damaschke, Papendorf (DE)

(73) Assignee: SIKA Dr. Siebert & Kühn GmbH & Co. KG, Kaufungen (DE)

( * ) Notice: Subject to any disclaimer, the term of this patent is extended or adjusted under 35 U.S.C. 154(b) by 54 days.

(21) Appl. No.: 16/567,284

(22) Filed: Sep. 11, 2019

(65) Prior Publication Data

US 2020/0081027 A1    Mar. 12, 2020

(30) Foreign Application Priority Data

Sep. 12, 2018   (DE) .......................... 102018122216.5

(51) Int. Cl.
    *G01P 5/26*    (2006.01)
    *G01F 1/66*    (2006.01)
    *G01F 15/18*   (2006.01)
    *G01P 1/02*    (2006.01)

(52) U.S. Cl.
    CPC .............. *G01P 5/26* (2013.01); *G01F 1/661* (2013.01); *G01F 15/18* (2013.01); *G01F 1/662* (2013.01); *G01P 1/026* (2013.01)

(58) Field of Classification Search
    CPC . G01P 5/26; G01P 1/026; G01F 1/661; G01F 1/662; G01F 15/18
    USPC .......................................................... 73/861
    See application file for complete search history.

(56) References Cited

U.S. PATENT DOCUMENTS

| | | | | |
|---|---|---|---|---|
| 5,587,796 A | * | 12/1996 | Rakitsch | B41F 33/0036 356/425 |
| 2002/0174728 A1 | * | 11/2002 | Beresford | G01P 15/093 73/861 |
| 2015/0260560 A1 | | 9/2015 | Quin et al. | |
| 2017/0307580 A1 | | 10/2017 | Kim et al. | |

FOREIGN PATENT DOCUMENTS

| | | | |
|---|---|---|---|
| CA | 2439242 A1 | 3/2005 | |
| DE | 102006039489 B3 | 1/2008 | |
| DE | 102007040970 B3 * | 4/2009 | ............. G01F 1/662 |
| DE | 102007040970 B3 | 4/2009 | |
| DE | 102009005800 | 7/2010 | |
| DE | 102014205882 B3 | 8/2015 | |
| DE | 102015001826 B3 | 3/2016 | |

OTHER PUBLICATIONS

Translation of DE-102007040970-B3 (provided by Applicant) (Year: 2009).*

* cited by examiner

*Primary Examiner* — Nathaniel T Woodward
(74) *Attorney, Agent, or Firm* — Dinsmore & Shohl LLP

(57) ABSTRACT

A pipe adapter for optical flow measurement having a fluid pipe that has a flow-through inner flow space. At least one window element transparent to a measurement optics is introduced in the fluid pipe. The fluid pipe is surrounded, at least in the region of the window element, by a pressure-resistant housing by which the window element is mounted in an inner housing space, and with the inner housing space is at least indirectly fluidically interactive and/or in fluidic communication with the inner flow space.

10 Claims, 2 Drawing Sheets

FLOW-THROUGH PIPE ADAPTER FOR OPTICAL FLOW MEASUREMENT

REFERENCE TO RELATED APPLICATION

This application claims priority to German patent application No. DE 10 2018 122 216.5, filed Sep. 12, 2018, the entire content of which is incorporated herein by reference.

FIELD OF THE INVENTION

This disclosure relates to a pipe adapter for optical flow measurement technology having a fluid pipe that has a flow-through inner space, wherein at least one window element transparent to a measurement optics is introduced in the fluid pipe.

BACKGROUND OF THE INVENTION

CA 2 439 242 A1 discloses a pipe adapter for optical flow measurement technology having a fluid pipe that has a flow-through inner space, wherein at least one window element transparent to a measurement optics is introduced in the fluid pipe. The window element forms a window transparent to the light source used and is inserted in a locally bounded manner in the fluid pipe. The window is formed with a curvature here so that the fluid pipe is inserted without interruption and without forming flow disruption elements in the wall of the pipe member. The corresponding observation for the optical flow measurement technique can take place through the window and a laser is used as the light source so that the window element comprises a material that is transparent to the laser wavelength. The fluid pipe of the pipe adapter can here be irradiated through by the laser radiation in that a separate window element is respectively used at diametrically opposite sides.

A further embodiment of a pipe adapter for optical measurement technology is known from DE 10 2009 005 800 A1 and a measurement tube is arranged projecting vertically downwardly at a fluid pipe and a slide-in window is located in the transition region between the fluid pipe and the measurement tube. The slide-in window is inserted in a reamed region and an interruption of the basic cylindrical shape results for the inner contour of the fluid pipe in the region of the window element. It is furthermore the case that common window elements have to be configured in a very laborious manner for high fluid pressures in the fluid pipe since the window element is also acted on by the full fluid pressure and consequently has to be installed correspondingly laboriously in the fluid pipe. A risk of leaks, that always have to be avoided, thereby results over a longer period of use of the pipe adapter.

SUMMARY OF THE INVENTION

The object of the disclosure is the further development of a pipe adapter for optical measurement technology comprising a fluid pipe in which a window element is introduced, wherein the pipe adapter should be configured in a simple manner, and wherein the pipe adapter should be configured such that high pressures of a fluid can be conducted through the fluid pipe.

The disclosure includes the technical teaching that the fluid pipe is surrounded, at least in the region of the window element, by a pressure-resistant housing by which the window element is received in an inner housing space, and wherein the inner housing space is at least indirectly fluidically interactive and/or in fluidic communication with the inner flow space.

The same fluidic pressure is present both in the inner housing space and in the inner flow space due to the at least indirect fluidic communication of the inner housing space with the inner flow space. Consequently, forces are no longer exerted on the window element by the fluid and the window element can be configured in a simple construction manner, in particular, without withstanding high fluidic pressures. The window element can in particular be configured such that no substantial difference from a cylinder jacket surface is produced in the fluid pipe so as to cause no disruption in the fluid flow, where possible.

There are a plurality of options for configuring the window element; for example, it can be configured as a locally bounded insert in the wall of the fluid pipe without the reception of the window element in the fluid pipe having to withstand greater pressures. An advantageous embodiment of the window element can be achieved by means of a cylindrical pipe section that is formed from a transparent material. The cylindrical pipe section can in particular have approximately the same outer and inner diameters as the fluid pipe itself and the pipe section only forms a path section in a longitudinal extent of the fluid pipe. This cylindrical pipe section can be completely transparent, with no demands having to be made on a special strength at the cylindrical pipe section. The material for forming the cylindrical pipe section can, for example, be selected from a glass body or from a glass ceramic material.

In accordance with an embodiment, the cylindrical pipe section is introduced in a region of an axial interruption of the fluid pipe and forms a cylindrical inner space that adjoins the inner flow space of the fluid pipe without interruption and with the same diameter. Two fluid pipes in particular adjoin the end sides of the cylindrical tube section, with both fluid pipes and the cylindrical pipe section having identical inner contours, in particular inner diameters.

The cylindrical pipe section is particularly advantageously connected at at least one end side to the fluid pipe or to the fluid pipes by means of a connector element, with the connector element being fluid permeable. The connector element can for this purpose, for example, comprise a porous material and/or a sintered material through which the fluid can pass. In the sense of the present disclosure, an at least indirect fluidic communication thus results between the inner flow space and the inner housing space, with a number of microbores or the like also being possible, for example, that do not influence the flow in the fluid pipe and also not in the cylindrical pipe section. The at least indirect fluidic communication here describes every form of a fluidic communication that enables a pressure equalization between the inner flow space and the inner housing space. Membrane connections or the like are also covered thereby, for example.

Provision can in particular be made that an elastic membrane is formed between the inner flow space and the inner housing space so that a pressure equalization is adopted between the inner flow space and the inner housing space on a deformation of the membrane. The inner housing space consequently does not necessarily have to have a fluid exchange with the inner flow space so that the inner spaces are connected to one another interactively by means of the membrane. The elastic membrane is advantageously formed by means of the connector element and/or as part of the connector element. The membrane can, for example, be formed from a plastic, in particular from a vulcanized rubber material, from a natural rubber material, or from another elastomer or can at least comprise these materials. The interaction between the inner flow space and the inner housing space is consequently produced in that the membrane can, for example, arch on a pressure difference on the two membrane sides and the fluids can thus exert an interaction with one another in the spaces.

Provision is made to be able to perform the optical flow measurement that the housing also has at least one window element composed of a transparent material, for example, glass or a glass ceramic material. The window element can be configured here such that it can easily withstand the internal pressure of the fluid in the inner housing space since the window element in the housing does not have to be adapted to the inner contour of the housing, for example, like the inner contour of the fluid pipe. The window element can, for example, be formed from a planar surface member and can be encompassed in the housing. Typical window elements for pressure systems are mounted in a multiscrew flange and the window elements are, for example, circular and are encompassed in a pressure tight manner between two flange rings.

Even further, the housing may be formed from a metal material, with the fluid pipe extending into the inner housing space at both oppositely disposed sides of the housing. The connection between the lateral planar surfaces of the, for example, cylindrical or cube-shaped housing and the fluid pipe can be welded connections, with the fluid pipes alternatively also being screwed to the housing.

In accordance with the disclosure, the pipe adapter is used such that the inner housing space is filled with the same fluid as the fluid that is conducted through the inner flow space. Optical advantages can thereby in particular be produced if only one type of fluid is present for the optical flow measurement both in the fluid pipe and in the inner housing space. The inner housing space can here be pre-filled with the fluid that should be conducted through the pipe adapter.

BRIEF DESCRIPTION OF THE DRAWINGS

Further measures are shown in more detail below together with the description of a preferred embodiment of the disclosure with reference to the Figures. There are shown.

DETAILED DESCRIPTION OF THE INVENTION

Figure 1:
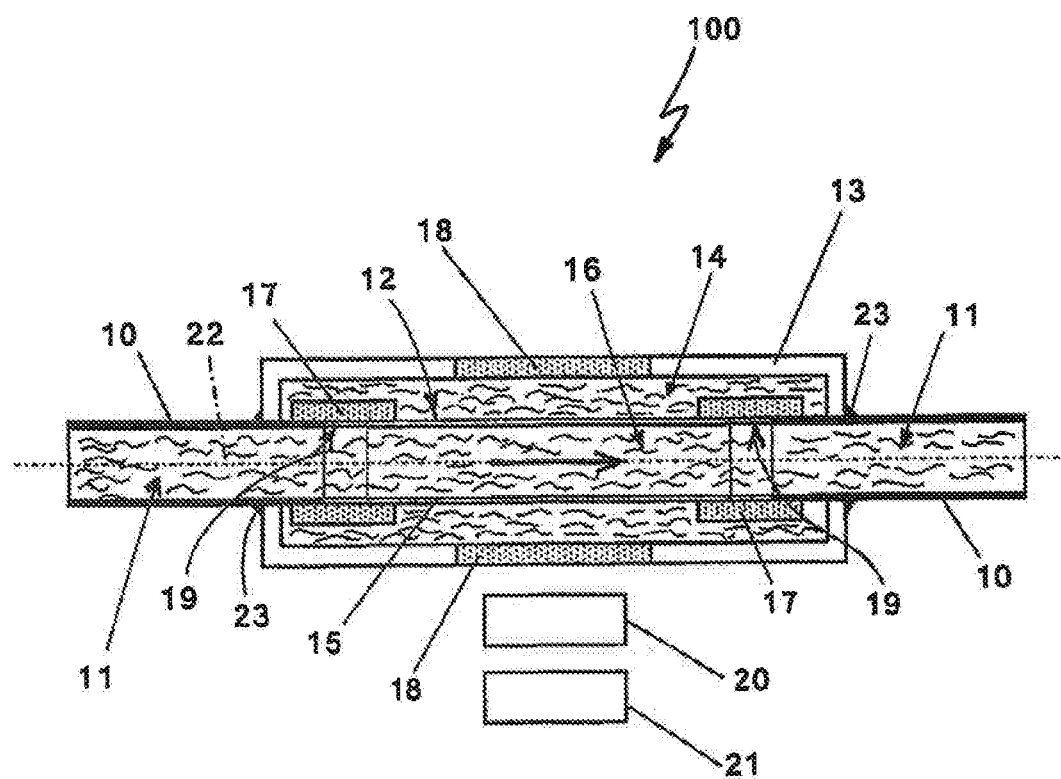
FIG. 1 is a first schematic view of a pipe adapter in a full cross-section.
Figure 2:
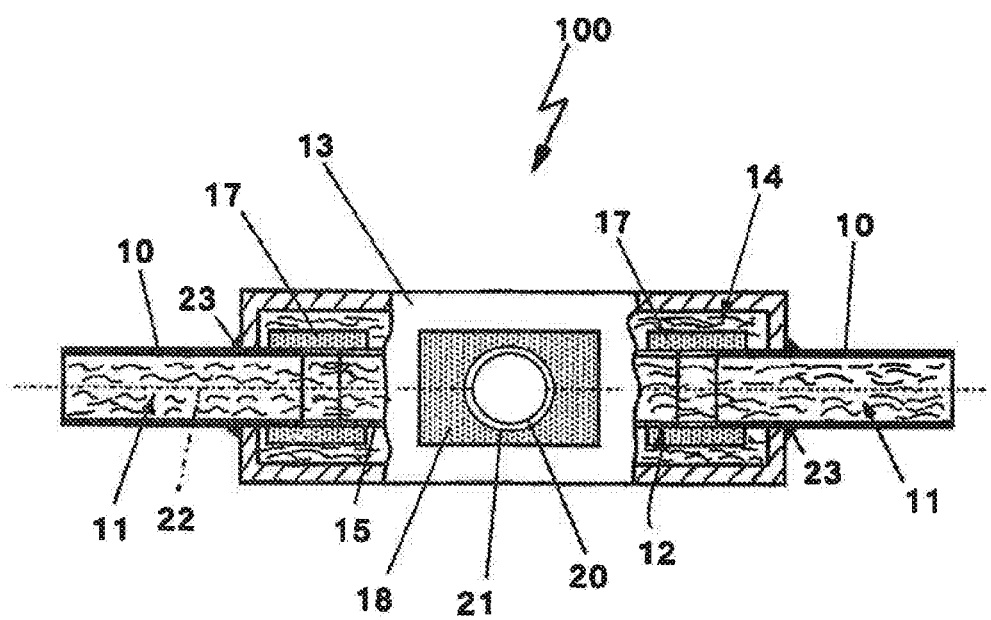
FIG. 2 is a second schematic view of a pipe adapter with a partial cross-section and in a position rotated by 90° about a longitudinal pipe axis with respect to FIG. 1.

FIGS. 1 and 2 each show a pipe adapter 100 and in FIG. 1 the pipe adapter 100 is shown in a substantially fully cross-sectional view; and in FIG. 2 the pipe adapter 100 is rotated by 90° about a longitudinal axis and is shown in a partial cross-section.

The pipe adapter 100 is inserted in the extent of a fluid pipe 10 and is flowed through by a fluid that is conducted by a fluid pipe 10 to the pipe adapter 100 and is conducted out of the pipe adapter 100 by a fluid pipe 10.

The optical flow measurement is based on the irradiation of radiation and on the subsequent sensor detection of the radiation. For this purpose, the pipe adapter 100 has to form a window through which the radiation can be irradiated into the fluid. An optics 20 and a sensor 21, that are only shown schematically in an arrangement in front of the pipe adapter 100, serve this purpose and the sensor detection.

The fluid pipe 10 is interrupted and a window element 12 that is formed as a cylindrical pipe section 15 is inserted in the interruption. The divided fluid pipe 10 and the cylindrical pipe section 15 extend in a common longitudinal axis 22.

The cylindrical pipe section 15 is formed with respect to the diameter, in particular with respect to the inner diameter, such that the inner flow space 11 of the fluid pipe 10 is continued without interruption over the cylindrical pipe section 15. No flow interruption is thereby produced in the flow of the fluid in the inner flow space 11 of the fluid pipe 12, even when flowing through the cylindrical pipe section 15 via the cylindrical inner space 16.

The window element 12 formed as a cylindrical pipe section 15 is received between the ends of the fluid pipe 10 by means of connector elements 17. The connector elements 17 form cuffs, for example, that fully surround the fluid pipes 10 and the outer sides of the cylindrical pipe section 15.

The connector elements 17 comprise a porous material, in particular a material permeable to fluid to a small degree; for example, a porous material and in particular a sintered material, for example a sintered metal.

The window element 12 with the connector elements 17 is furthermore fully surrounded by means of a housing 13 and the housing 13 is connected to the fluid pipes 10 in a pressure tight manner via connection points 23, for example by welded connections or screw connections.

Due to the permeability of the connector elements 17, the fluid can move out of the inner flow space 11 of the fluid pipes 10 or from the cylindrical inner space 16 of the pipe section 15 through the material of the connector element 17 into an inner housing space 14 that is surrounded by the housing 13. If the pipe adapter 100 is used for higher or for very high fluid pressures, the same fluid pressure is formed in the inner housing space 14 as in the fluid pipes 10 and in the cylindrical pipe section 15. Since the inner housing space 14, however, surrounds the cylindrical pipe section 15 at the outer periphery, the pressure action on the fluid in the cylindrical inner space 16 of the pipe section 15 does not effect any mechanical pressure load on the pipe section 15 since the same fluid pressure is present at both the inner side and at the outer side of the pipe section 15.

To carry out the optical flow measurement, the window element 12 in accordance with the embodiment is a cylindrical pipe section 15 of a transparent design so that the fluid can be observed through the pipe section 15 at at least one measurement wavelength. A window element 18 is located in the housing 13 and can be of a simpler configuration than if a window element 12 were introduced in the fluid pipe 10 that would have to withstand corresponding fluid pressures. For example, the window element 18 in the housing 13 can be formed as a planar window element and the inner contour of the housing 13 can be interrupted by the window element 18, for example differing from a cylindrical inner housing space 14. Due to the cylindrical pipe section 15, no flow cross-sectional region is produced within the fluid pipe 10 and within the fluid section 15 that differs from the diameter and from the circular cross-sectional shape of the fluid pipe 10. However, the disruption of the inner contour of the inner housing space 14 is irrelevant for the flow of the fluid through the fluid pipe 10 for the arrangement of a window element 18 that can be acted on by pressure in the housing 13 since the inner housing space 14 is not flowed through and is only acted on by the same pressure.

The disclosure is not restricted in its design to the preferred embodiment specified above. A number of variants is rather conceivable that also makes use of the solution shown with generally differently designed embodiments. All the features and/or advantages, including any construction details or spatial arrangements, originating from the claims, the description or the drawings can be essential to the disclosure both per se and in the most varied combinations.

REFERENCE NUMERAL LIST

100 pipe adapter
10 fluid pipe
11 inner flow space
12 window element
13 housing
14 inner housing space
15 cylindrical pipe section
16 cylindrical inner space
17 connector element
18 window element
19 open region
20 optics
21 sensor
22 longitudinal axis
23 connection point

The invention claimed is:

1. A pipe adapter for optical flow measurement, comprising:
   a fluid pipe with a flow-through inner flow space for a fluid;
   at least one window element introduced in the fluid pipe, the at least one window element being transparent to a measurement optics;
   a pressure resistant housing having an inner housing space, the pressure resistant housing surrounding the fluid pipe at least in a region of the at least one window element and mounting the at least one window element in the inner housing space, the inner housing space being at least indirectly fluidically interactive and/or in fluidic communication with the inner flow space, wherein the at least one window element comprises a cylindrical pipe section composed of a transparent material; and
   a connector element that connects the cylindrical pipe section at at least one end side to the fluid pipe, the connector element made of a fluid-permeable material.

2. The pipe adapter according to claim 1, wherein the cylindrical pipe section is formed from a glass element or a glass ceramic element.

3. The pipe adapter according to claim 1, wherein the cylindrical pipe section is introduced in a region of an axial interruption of the fluid pipe and forms a cylindrical inner space that adjoins the inner flow space of the fluid pipe without interruption, the cylindrical pipe section and the fluid pipe both having a same diameter.

4. The pipe adapter according to claim 1, wherein the fluid-permeable material forming the connector element is a porous material and/or a sintered material through which the fluid can pass.

5. The pipe adapter according to claim 1, further comprising an elastic membrane formed between the inner flow space of the fluid pipe and the inner housing space of the pressure resistant housing, and a deformation of the elastic membrane adopting a pressure equalization between the inner flow space and the inner housing space.

6. The pipe adapter according to claim 5, wherein the elastic membrane is formed by the connector element and/or a part of the connector element.

7. The pipe adapter according to claim 1, wherein the pressure resistant housing comprises at least one window element composed of a transparent material.

8. The pipe adapter according to claim 7, wherein the at least one window element of the pressure resistant housing is formed from a planar surface and is encompassed in the pressure resistant housing.

9. The pipe adapter according to claim 1, wherein the pressure resistant housing is formed from a metal material, and the fluid pipe extends through the inner housing space at oppositely disposed end surfaces of the pressure resistant housing.

10. The pipe adapter according to claim 1, wherein the inner housing space is filled with the same fluid that is flowing through the inner flow space.

* * * * *